(12) United States Patent
Oh et al.

(10) Patent No.: US 7,816,039 B2
(45) Date of Patent: Oct. 19, 2010

(54) NON-AQUEOUS ELECTROLYTE FOR A LITHIUM BATTERY AND LITHIUM BATTERY INCLUDING THE SAME

(75) Inventors: Jung Kang Oh, Gumi-si (KR); Young Jai Cho, Gumi-si (KR); Ho Seok Yang, Daejeon (KR); Kab Youl Lee, Gumi-si (KR)

(73) Assignee: Panax Etec Co., Ltd, Busan (KR)

( * ) Notice: Subject to any disclaimer, the term of this patent is extended or adjusted under 35 U.S.C. 154(b) by 105 days.

(21) Appl. No.: 12/000,704

(22) Filed: Dec. 17, 2007

(65) Prior Publication Data

US 2008/0153006 A1    Jun. 26, 2008

(30) Foreign Application Priority Data

Dec. 21, 2006   (KR) ................. 10-2006-0132144

(51) Int. Cl.
*H01M 6/16*   (2006.01)

(52) U.S. Cl. .................. 429/326; 429/327; 429/329; 429/334; 429/335; 429/337; 429/341; 429/199; 429/200

(58) Field of Classification Search ................ 429/330, 429/326, 337, 338, 341, 342, 334, 332, 335, 429/199, 200, 327, 329
See application file for complete search history.

(56) References Cited

U.S. PATENT DOCUMENTS

| | | | |
|---|---|---|---|
| 5,352,548 | A | 10/1994 | Fujimoto et al. |
| 5,633,099 | A | 5/1997 | Yokoyama et al. |
| 5,712,059 | A | 1/1998 | Barker et al. |
| 5,714,281 | A | 2/1998 | Naruse et al. |
| 6,048,637 | A | 4/2000 | Tsukahara et al. |
| 6,114,070 | A | 9/2000 | Yoshida et al. |
| 6,506,524 | B1 | 1/2003 | McMillan et al. |
| 6,919,145 | B1 | 7/2005 | Kotato et al. |

FOREIGN PATENT DOCUMENTS

| | | | |
|---|---|---|---|
| EP | 850933 | * | 7/1998 |
| JP | 04-087156 | | 3/1992 |
| JP | 07-006786 | | 1/1995 |
| JP | 2001-006729 | | 1/2001 |
| JP | 2007-149535 | * | 6/2007 |

* cited by examiner

*Primary Examiner*—Laura S Weiner
(74) *Attorney, Agent, or Firm*—The Webb Law Firm

(57) ABSTRACT

A non-aqueous electrolyte for a lithium battery includes a non-aqueous organic solvent, the organic solvent including one or more of a carbonate-based solvent, an ester-based solvent, an ether-based solvent, and/or a ketone-based solvent, a lithium salt, and a hexafluoroacetylacetone in an amount of about 0.02 parts by weight to about 10 parts by weight, based on 100 parts by weight of the non-aqueous organic solvent.

7 Claims, 1 Drawing Sheet

NON-AQUEOUS ELECTROLYTE FOR A LITHIUM BATTERY AND LITHIUM BATTERY INCLUDING THE SAME

BACKGROUND OF THE INVENTION

1. Field of the Invention

Embodiments of the present invention relate to a non-aqueous electrolyte for a lithium battery and a lithium battery including the same.

2. Description of the Related Art

Lithium batteries, e.g., secondary lithium batteries, may have an average discharge voltage of about 3.6 V to about 3.7 V, thereby exhibiting a higher electric power than, e.g., alkaline batteries, nickel-metal hydride (Ni-MH) batteries, nickel-cadmium (Ni—Cd) batteries, and so forth.

An electrolyte solution of a lithium battery may require electrochemical stability in a charge/discharge voltage range of about 0 V to about 4.2 V in order to ensure high driving voltage. Further, the electrolyte solution may require high ionic conductivity, a high dielectric constant, and low viscosity. However, the conventional electrolyte solution of the lithium battery may fail to exhibit the three above requirements, i.e., all of high ionic conductivity, a high dielectric constant, and low viscosity. Therefore, there is a need for a non-aqueous electrolyte for a lithium battery capable of improving lifespan and preservation properties of the lithium battery, while maintaining good performance thereof.

SUMMARY OF THE INVENTION

Embodiments of the present invention are therefore directed to a non-aqueous electrolyte for a lithium battery and a lithium battery including the same, which substantially overcome one or more of the disadvantages of the related art.

It is therefore a feature of an embodiment of the present invention to provide a non-aqueous electrolyte capable of imparting improved capacity and performance to a battery.

It is another feature of an embodiment of the present invention to provide a lithium battery with a non-aqueous electrolyte capable of imparting improved capacity and performance thereto.

At least one of the above and other features and advantages of the present invention may be realized by providing a non-aqueous electrolyte for a lithium battery, including a non-aqueous organic solvent, a lithium salt, and a hexafluoroacetylacetone in an amount of about 0.02 parts by weight to about 10 parts by weight, based on 100 parts by weight of the non-aqueous organic solvent. The lithium salt may include one or more of $LiPF_6$, $LiClO_4$, $LiAsF_6$, $LiBF_4$, $LiN(C_2F_5SO_3)_2$, $LiN(C_2F_5SO_2)_2$, $LiN(CF_3SO_2)_2$, $LiSbF_6$, $LiCF_3SO_3$, $LiC_4F_9SO_3$, $LiAlO_4$, $LiAlCl_4$, LiCl, LiI, and/or $LiN(C_xF_{2x+1}SO_2)(C_yF_{2y+1}SO_2)$ wherein x and y are each independently a positive integer, and a concentration of the lithium salt in the non-aqueous electrolyte may be about 0.6 M to about 2.0 M.

The non-aqueous organic solvent may include one or more of a carbonate-based solvent, an ester-based solvent, an ether-based solvent, and/or a ketone-based solvent. The carbonate-based solvent may include a mixture of at least one cyclic carbonate-based organic solvent and at least one chain carbonate-based organic solvent. The cyclic carbonate-based organic solvent may include one or more of ethylene carbonate (EC), propylene carbonate (PC), 1,2-butylene carbonate (BC), 2,3-butylene carbonate, 1,2-pentylene carbonate, and/or 2,3-pentylene carbonate, and the chain carbonate-based organic solvent may include one or more of dimethyl carbonate (DMC), diethyl carbonate (DEC), dipropyl carbonate (DPC), ethyl methyl carbonate (EMC), methyl propyl carbonate (MPC), and/or ethyl propyl carbonate (EPC). The non-aqueous organic solvent may include the cyclic carbonate-based organic solvent and the chain carbonate-based organic at a volumetric ratio of about 1:1 to about 1:9. The non-aqueous organic solvent may include an ester-based solvent, the ester-based solvent having one or more of methyl acetate, ethyl acetate, propyl acetate, methyl propionate, ethyl propionate, γ-butyrolactone, γ-valerolactone, γ-caprolactone, δ-valerolactone, and/or ∈-caprolactone. The non-aqueous organic solvent may include an ether-based solvent having one or more of tetrahydrofuran, 2-methyltetrahydrofuran, and/or dibutyl ether. The non-aqueous organic solvent may include polymethylvinylketone.

The non-aqueous electrolyte may further include an aromatic hydrocarbon-based compound represented by a general Formula I,

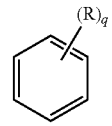

Formula I wherein R may be a hydrogen atom, a halogen, or a $C_1$-$C_{10}$ alkyl group, and q may be an integer from 1 to 6. The aromatic hydrocarbon-based compound may include one or more of benzene, fluorobenzene, bromobenzene, chlorobenzene, toluene, xylene, mesitylene, fluorotoluene, difluorotoluene, and/or trifluorotoluene. The non-aqueous organic solvent may include a carbonate-based solvent, and the aromatic hydrocarbon-based compound and the carbonate-based solvent may be at a volumetric ratio of about 1:1 to about 1:30.

At least one of the above and other features and advantages of the present invention may be realized by providing a lithium battery, including a positive electrode facing a negative electrode, a non-aqueous electrolyte between the positive and negative electrodes, and a separator electrically separating the positive and negative electrodes, wherein the non-aqueous electrolyte includes a non-aqueous organic solvent, a lithium salt, and a hexafluoroacetylacetone in an amount of about 0.02 parts by weight to about 10 parts by weight, based on 100 parts by weight of the non-aqueous organic solvent. The non-aqueous organic solvent may include one or more of a carbonate-based solvent, an ester-based solvent, an ether-based solvent, and/or a ketone-based solvent. The non-aqueous organic solvent may further include an aromatic hydrocarbon-based compound represented by a general Formula II,

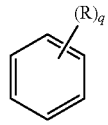

Formula II wherein R may be a hydrogen atom, a halogen, or a $C_1$-$C_{10}$ alkyl group, and q may be an integer from 1 to 6.

The positive electrode may include a metal coated with an active material, the active material having one or more of $Li_xMn_{1-y}M_yA_2$, $Li_xMn2O_{4-z}X_z$, $Li_xMn_{2-y}M_yM'_zA_4$, $Li_xCo_{1-y}M_yA_2$, $Li_xCo_{1-y}M_yO_{2-z}X_z$, $Li_xNi_{1-y}M_yO_{2-z}X_z$, $Li_xNi_{1-y}Co_yO_{2-z}X_z$, $Li_xNi_{1-y-z}Co_yM_zA_\alpha$, $Li_xNi_{1-y-z}Co_yM_zO_{2-\alpha}X_\alpha$, $Li_xNi_{1-y-z}Mn_yM_zA_\alpha$ and $Li_xNi_{1-y-z}Mn_yM_zO_{2-\alpha}X_\alpha$, wherein $0.9 \leq x \leq 1.1$, $0 \leq y \leq 0.5$, $0 \leq z \leq 0.5$, $0 \leq \alpha \leq 2$, each of M and M' may be independently Mg, Al, Co, K, Na, Ca, Si, Ti, Sn, V, Ge, Ga, B, As, Zr, Mn, Cr, Fe, Sr, V or a rare earth element, A may be O, F, S, or P, and X may be F, S, or P. The negative electrode may include metal coated with an active material, the active material including one or more of crystalline carbon, amorphous carbon, a carbon composite, a carbon fiber, a lithium metal, a lithium alloy, and/or a lithium composite.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
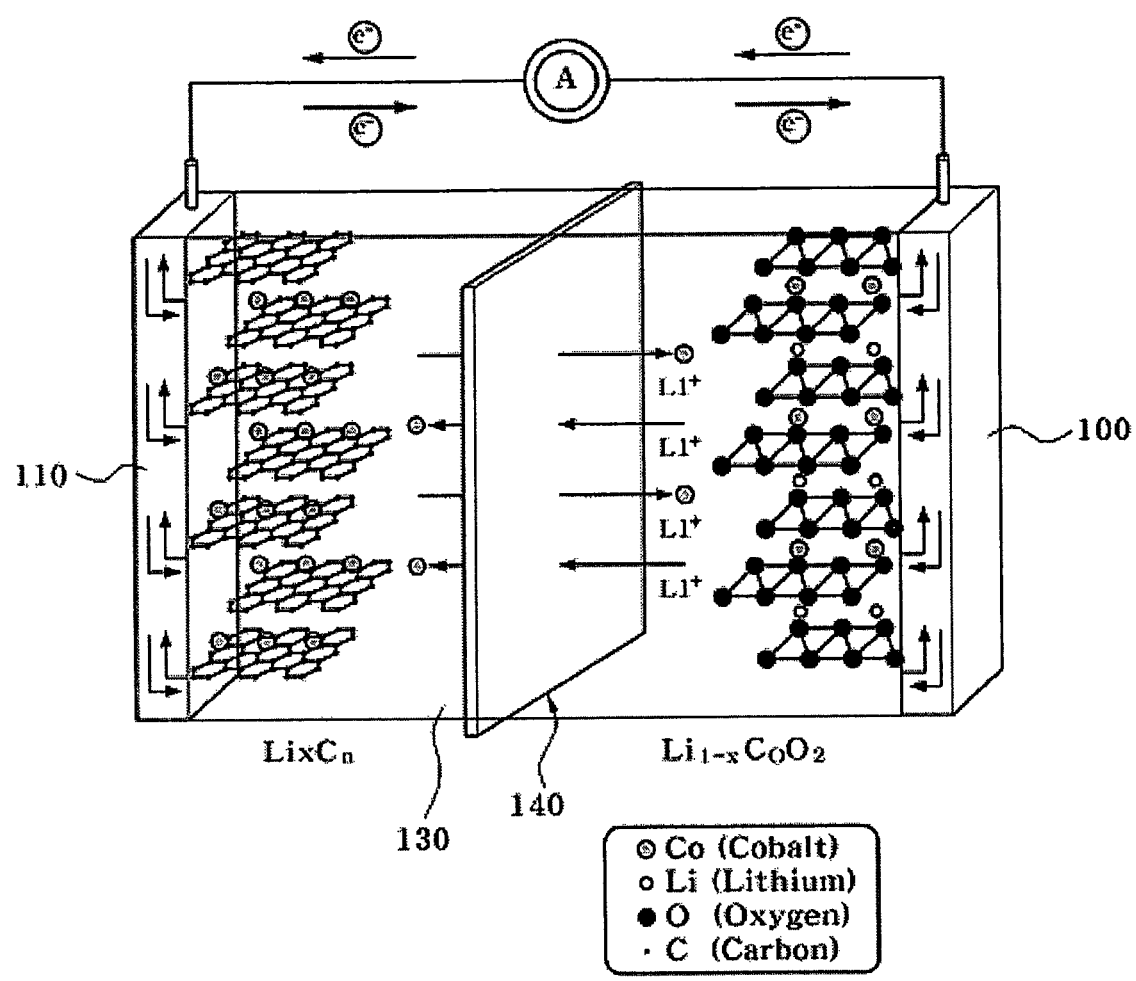
FIG. 1 illustrates a schematic diagram of a lithium secondary battery including a non-aqueous electrolyte according to an embodiment of the present invention.

Korean Patent Application No. 10-2006-0132144, filed on Dec. 21, 2006, in the Korean Intellectual Property Office, and entitled: "Non-aqueous Electrolyte for Lithium Secondary Battery and Lithium Secondary Battery Comprising the Same," is incorporated by reference herein in its entirety.

Embodiments of the present invention will now be described more fully hereinafter with reference to the accompanying drawing, in which an exemplary embodiment of the invention is illustrated. Aspects of the invention may, however, be embodied in different forms and should not be construed as limited to the embodiments set forth herein. Rather, these embodiments are provided so that this disclosure will be thorough and complete, and will fully convey the scope of the invention to those skilled in the art.

In the figure, the dimensions of layers and regions may be exaggerated for clarity of illustration. It will also be understood that when an element is referred to as being "between" two layers or elements, it can be the only element between the two elements, or one or more intervening elements may also be present.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an nth member, where n is greater than 3, whereas the expression "at least one selected from the group consisting of A, B, and C" does not.

As used herein, the terms "a" and "an" are open terms that may be used in conjunction with singular items or plural items. For example, the term "an aromatic hydrocarbon-based compound" may represent a single compound, e.g., benzene, or multiple compounds in combination, e.g., benzene mixed with fluorobenzene.

An exemplary embodiment of a non-aqueous electrolyte according to the present invention may include a non-aqueous organic solvent and a lithium salt. In this respect, it is noted that hereinafter "non-aqueous" refers to a compound including substantially no water ($H_2O$).

The non-aqueous organic solvent of the non-aqueous electrolyte may function as a medium allowing migration of electrochemical reaction-mediated ions in batteries. To secure favorable migration of the ions through an increase in dissociation degree of the ions, the non-aqueous organic solvent may have a high dielectric constant, i.e., high polarity, and low viscosity. For example, the non-aqueous organic solvent may include a mixture including at least one solvent with a high dielectric constant and high viscosity, and at least one solvent with a low dielectric constant and a low viscosity. The non-aqueous organic solvent may include one or more of a carbonate-based solvent, an ester-based solvent, an ether-based solvent, and/or a ketone-based solvent.

The carbonate-based solvent may include a mixture of at least one cyclic carbonate-based organic solvent and at least one chain carbonate-based organic solvent. A volumetric ratio of the cyclic carbonate-based organic solvent to the chain carbonate-based organic solvent may be about 1:1 to about 1:9, e.g., about 1:1.5 to about 1:4, in order to provide good lifespan and preservation properties to a battery. The cyclic carbonate-based organic solvent may include, e.g., one or more of ethylene carbonate (EC), propylene carbonate (PC), 1,2-butylene carbonate (BC), 2,3-butylene carbonate, 1,2-pentylene carbonate, and/or 2,3-pentylene carbonate. The chain carbonate-based organic solvent may include, e.g., one or more of dimethyl carbonate (DMC), diethyl carbonate (DEC), dipropyl carbonate (DPC), ethyl methyl carbonate (EMC), methyl propyl carbonate (MPC), and/or ethyl propyl carbonate (EPC). For example, the carbonate-based solvent may include a mixture including EC and/or PC, as a solvent having a high dielectric constant, and DMC, EMC and/or DEC, as a solvent having a low viscosity. If, for example, artificial graphite is used as a negative electrode active material, EC may be preferred as a solvent.

The ester-based solvent may include, e.g., one or more of methyl acetate, ethyl acetate, propyl acetate, methyl propionate, ethyl propionate, butyl acetate, γ-butyrolactone, γ-valerolactone, γ-caprolactone, δ-valerolactone, and/or ∈-caprolactone. The ether-based solvent may include, e.g., one or more of tetrahydrofuran, 2-methyltetrahydrofuran, and/or dibutyl ether. The ketone-based solvent may include, e.g., polymethylvinylketone.

The non-aqueous organic solvent may further include at least one aromatic hydrocarbon-based organic compound represented by a general Formula I below,

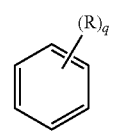

Formula I wherein R may be a hydrogen atom, a halogen, or a $C_1$-$C_{10}$ alkyl group, and q may be any integer from 1 to 6. For example, the aromatic hydrocarbon-based organic compound may be benzene. The hydrogen atom, halogen, and/or a $C_1$-$C_{10}$ alkyl group may be present in the hydrocarbon-based organic compound alone or in combination, e.g., in fluorobenzene, bromobenzene, chlorobenzene, toluene, xylene, mesitylene, fluorotoluene, difluorotoluene, trifluorotoluene, and so forth. If the aromatic hydrocarbon-based compound is used with a carbonate-based solvent, a volumetric ratio of the aromatic hydrocarbon-based compound to the carbonate-based solvent may be about 1:1 to about 1:30.

The lithium salt of the non-aqueous electrolyte may be dissolved in the non-aqueous organic solvent, and may function as a source of lithium ions in lithium batteries, thus enabling operation of the lithium batteries. A concentration of the lithium salt in the non-aqueous electrolyte may be about 0.6 M to about 2.0 M, e.g., about 0.7 M to about 1.6 M, in order to provide good electrical conductivity to the electrolyte and good viscosity to the lithium ions in terms of mobility. Suitable examples of lithium salt may include one or more of lithium hexafluorophosphate ($LiPF_6$), lithium perchlorate ($LiClO_4$), lithium hexafluoroarsenate ($LiAsF_6$), lithium tetrafluoroborate ($LiBF_4$), lithium hexafluoroantimonate ($LiSbF_6$), lithium aluminate ($LiAlO_4$), lithium aluminum tetrachloride ($LiAlCl_4$), lithium chloride (LiCl), lithium iodide (LiI), and/or lithium fluorosulfonate salts, e.g., $LiCF_3SO_3$, $LiC_4F_9SO_3$, $LiN(C_2F_5SO_3)_2$, $LiN(C_2F_5SO_2)_2$, $LiN(CF_3SO_2)_2$, $LiN(C_xF_{2x+1}SO_2)(C_yF_{2y+1}SO_2)$ wherein x and y may each independently be a positive integer), and so forth.

The non-aqueous electrolyte may further include a hexafluoroacetylacetone represented by Formula II below.

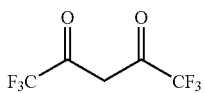

Formula II

An amount of the hexafluoroacetylacetone in the non-aqueous electrolyte may be about 0.02 parts by weight to about 10 parts by weight, based on 100 parts by weight of the non-aqueous organic solvent. A hexafluoroacetylacetone in an amount above about 0.02 parts by weight based on 100 parts by weight of the non-aqueous organic solvent and below about 10 parts by weight based on 100 parts by weight of the non-aqueous organic solvent may provide an optimal capacity to the battery.

The non-aqueous electrolyte may further include additives to improve lifespan and preservation properties of a battery.

The non-aqueous electrolyte according to embodiments of the present invention may be advantageous in exhibiting superior preservation properties and long lifespan at a temperature range of about (−20) ° C. to about 60° C., thus improving stability and reliability of the battery. The non-aqueous electrolyte of the present invention may be employed in any lithium secondary battery, e.g., a lithium ion battery, a lithium polymer battery, and so forth.

An exemplary embodiment of a lithium battery including the non-aqueous electrolyte described above is illustrated in FIG. 1. More specifically, as illustrated in FIG. 1, a lithium secondary battery may include an electrolyte 130, a positive electrode 100, a negative electrode 110, and a separator 140 therebetween. The positive and negative electrodes 100 and 110 may be arranged to face each other, and the non-aqueous electrolyte 130 may be therebetween. It is noted that illustration of $LiCoO_2$ and $Li_xC_n$ as positive and negative active materials, respectively, in FIG. 1 is merely exemplary.

The electrolyte 130 of the lithium secondary battery may be the non-aqueous electrolyte discussed previously, and therefore, its detailed description will not be repeated.

The positive electrode 100 of the lithium secondary battery may be made of metal coated with a positive active material. The positive active material may include one or more of $Li_xMn_{1-y}M_yA_2$, $Li_xMn_2O_{4-z}X_z$, $Li_xMn_{2-y}M_yM'_zA_4$, $Li_xCo_{1-y}M_yA_2$, $Li_xCo_{1-y}M_yO_{2-z}X_z$, $Li_xNi_{1-y}M_yO_{2-z}X_z$, $Li_xNi_{1-y}Co_yO_{2-z}X_z$, $Li_xNi_{1-y-z}Co_yM_zA_\alpha$, $Li_xNi_{1-y-z}Co_yM_zO_{2-\alpha}X_\alpha$, $Li_xNi_{1-y-z}Mn_yM_zA_\alpha$ and $Li_xNi_{1-y-z}Mn_yM_zO_{2-\alpha}X_\alpha$, wherein $0.9 \leq x \leq 1.1$, $0 \leq y \leq 0.5$, $0 \leq z \leq 0.5$, $0 \leq \alpha \leq 2$. M and M' may be substantially the same or different, and each may independently be, e.g., magnesium (Mg), aluminum (Al), cobalt (Co), potassium (K), sodium (Na), calcium (Ca), silicon (Si), titanium (Ti), tin (Sn), vanadium (V), germanium (Ge), gallium (Ga), boron (B), arsenic (As), zirconium (Zr), manganese (Mn), chromium (Cr), iron (Fe), strontium (Sr), vanadium (V) or a rare earth element. A may be, e.g., oxygen (O), fluoride (F), sulfur (S), or phosphorous (P). X may be, e.g., fluoride (F), sulfur (S), or phosphorous (P).

The negative electrode 110 of the lithium secondary battery may include metal coated with a negative active material, e.g., carbon or lithium. For example, the negative active material may include amorphous carbon, crystalline carbon, a carbon composite, a carbon fiber, and so forth. Use of carbon may be advantageous due to its ability to reversibly intercalate and de-intercalate lithium ions. Examples of amorphous carbon may include hard carbon, coke, mesocarbon microbeads (MCMBs) calcinated at about 1,500° C. or lower, mesophase pitch-based carbon fibers (MPCFs), and so forth. Examples of crystalline carbon may include graphite-based materials, e.g., natural graphite, graphitized coke, graphitized MCMBs, graphitized MPCFs, and the like. The carbon may have a d002 interplanar distance of about 3.35 angstroms to about 3.38 angstroms, and may have a crystallite size (Lc) of about 20 nm or more as measured by X-ray diffraction.

In another example, the negative active material of the negative electrode 110 may include a lithium metal, a lithium alloy, and/or a lithium composite. The lithium alloy may include an alloy of lithium and a metal. The metal may be one or more of aluminum (Al), zinc (Zn), bismuth (Bi), cadmium (Cd), antimony (Sb), silicon (Si), lead (Pb), tin (Sn), gallium (Ga), and/or indium (In).

The metals for the positive and negative electrodes 100 and 110 may allow an external voltage to be applied thereto during charging, and may discharge the voltage during discharging. The positive active material may collect positive charges, and the negative active material may collect negative charges. The positive and negative electrodes 100 and 110 may be fabricated by preparing positive and negative electrode slurry compositions, respectively, and applying each composition to a respective, i.e., positive or negative, electrode collector. A positive electrode collector may include Al or Al-alloy. A negative electrode collector may include copper (Cu) or Cu-alloy. The positive and negative electrode collectors may have any suitable structure, e.g., a foil, a film, a sheet, a punched metal, a porous metal, an expanded metal, and so forth. The electrode slurry composition may include an active material, a binder, and a conductive agent dispersed in a solvent. The electrode slurry composition may further include a thickening agent.

The binder of the electrode slurry composition may hold the electrode components together by facilitating adhesion of electrode active materials to one another and to the collectors, and may offset swelling and contraction of active materials. Suitable examples of binder may include polyvinylidene fluoride, polyhexafluoropropylene-polyvinylidene fluoride copolymers, poly(vinylacetate), polyvinyl alcohol, polyethylene oxide, polyvinyl pyrrolidone, alkylated polyethylene oxide, polyvinyl ether, poly(methylmethacrylate), poly(ethylacrylate), polytetrafluoroethylene, polyvinylchloride, polyacrylonitrile, polyvinyl pyridine, styrene-butadiene rubbers, acrylonitrile-butadiene rubbers, and the like. An amount of the binder may be about 0.1% to about 30% by weight of a weight of the electrode active material. If an amount of the binder is too low, adhesion between the electrode active material and the collector may be insufficient. If the amount of the binder is too high, adhesion may be sufficient, but an amount of the electrode active material may be decreased, thus increasing a battery capacity.

The conductive agent of the electrode slurry composition may improve electrical conductivity. The conductive agent may be one or more of a graphite-based compound, a carbon black-based compound, and/or a metal-based compound. Examples of the graphite-based compounds may include artificial graphite and natural graphite. Examples of the carbon black-based compound may include acetylene black, ketjen black, denka black, thermal black, channel black, and the like. Examples of the metal based compounds may include tin, tin oxide, tin phosphate ($SnPO_4$), titanium oxide, potassium titanate, and a perovskite, e.g., $LaSrCoO_3$ or $LaSrMnO_3$. An amount of the conductive agent may be about 0.1% to about 10% by weight of a weight of the electrode active material. An amount of the conductive agent below about 0.1% may deteriorate electrochemical properties of the electrolyte. An amount of the conductive agent about 10% may decrease an energy density per weight.

The solvent of the electrode slurry composition may be any suitable non-aqueous or aqueous solvent. Examples of suitable non-aqueous solvents may include N-methyl-2-pyrrolidone (NMP), dimethylformamide, dimethylacetamide, N,N-dimethylaminopropylamine, ethylene oxide, tetrahydrofuran, and the like.

The thickening agent of the electrode slurry composition may be any suitable thickening agent capable of controlling viscosity of the active material. Examples of suitable thickening agents may include one or more of carboxymethyl cellulose, hydroxymethyl cellulose, hydroxyethyl cellulose, and/or hydroxypropyl cellulose.

The separator 140 of the lithium secondary battery may electrically separate the positive electrode 100 from the negative electrode 110, thereby preventing a short-circuit, while allowing passage of lithium ions. The separator 140 may have a single-layer structure or a multi-layer structure. The layers, whether monolayers or multi-layers, may include a microporous film, a woven fabric, and/or a non-woven fabric. For example, the separator 140 may include a porous polyolefin film coated with a highly stable resin. In another example, the separator 140 may include a polyethylene or polypropylene monolayer; a polyethylene/polypropylene bi-layer; or a polyethylene/polypropylene/polyethylene or polypropylene/polyethylene/polypropylene trilayer.

The positive and negative electrodes 100 and 110 with the separator 140 therebetween may be arranged in a can-type container, i.e., a battery case, followed by sealing an upper part of the container via, e.g., a cap assembly, to form a lithium secondary battery. The cap assembly may include a cap plate, an insulating plate, a terminal plate, and an electrode terminal. The cap assembly may be combined with an insulating case to seal the battery case. In addition, a terminal hole, into which an electrode terminal is inserted, may be arranged in the center of the cap plate. When the electrode terminal is inserted into the terminal hole, a tube-type gasket provided on an external surface of the electrode terminal may be also inserted into the terminal hole to insulate the electrode terminal from the cap plate. Once the cap assembly is coupled to the container, the electrolyte 130 may be injected into the container through an electrolyte injection hole, followed by sealing the electrolyte injection hole with a sealing means. The electrode terminal may be coupled to a negative electrode tap of the negative electrode and to a positive electrode tap of the positive electrode, thus operating as a negative or positive electrode terminal. The battery case of the lithium secondary battery may have any suitable shape, e.g., a cylinder, a pouch.

EXAMPLES

Example 1

A positive electrode was prepared as follows. $LiCoO_2$, i.e., a positive active material, polyvinylidene fluoride (PVDF), i.e., a binder, and carbon, i.e., a conductive agent, were mixed at a weight ratio of 92:4:4, and were dispersed in N-methyl-2-pyrrolidone to form a positive electrode slurry, followed by coating the positive electrode slurry on an aluminum foil having a thickness of 20 μm. The positive electrode slurry on the aluminum foil was dried and rolled to form the positive electrode.

A negative electrode was prepared as follows. Artificial graphite, i.e., a negative active material, a styrene-butadiene rubber (SBR), i.e., a binder, and carboxymethyl cellulose, i.e., a thickening agent, were mixed at a weight ratio of 96:2:2, and were dispersed in water to form a negative electrode slurry. The negative electrode slurry was coated on a copper foil having a thickness of 15 μm. The negative electrode slurry on the copper foil were dried and rolled to form the negative electrode.

A polyethylene (PE) film separator having a thickness of 20 μm was interposed between the positive and negative electrodes. The electrodes with the separator were rolled, pressed, and inserted into a cylindrical can. An electrolyte was added to the cylindrical can to form a secondary lithium battery.

The electrolyte was prepared as follows. Ethylene carbonate (EC), ethyl methyl carbonate (EMC), and dimethyl carbonate (DMC) were mixed at a volumetric ratio of 1:1:1 to form an organic solvent. Vinyl ethylene carbonate (VEC) and fluoroethylene carbonate (FEC) were added to the organic solvent. Lithium salt, i.e., $LiPF_6$, was dissolved in the organic solvent. Amounts of the organic solvent and $LiPF_6$ were adjusted so the concentration of the $LiPF_6$ in the solvent was 1.3M. Hexafluoroacetylacetone was added to the mixture of lithium salt and organic solvent in an amount of 0.05 parts by weight based on 100 parts by weight of the organic solvent.

Example 2

A lithium battery was produced in substantially the same method of Example 1, with the exception of using the hexafluoroacetylacetone in an amount of 0.1 parts by weight based on 100 parts by weight of the non-aqueous organic solvent.

Example 3

A lithium battery was produced in substantially the same method of Example 1, with the exception of using the hexafluoroacetylacetone in an amount of 1.0 part by weight based on 100 parts by weight of the non-aqueous organic solvent.

Example 4

A lithium battery was produced in substantially the same method of Example 1, with the exception of using the hexafluoroacetylacetone in an amount of 2.0 parts by weight based on 100 parts by weight of the non-aqueous organic solvent.

Example 5

A lithium battery was produced in substantially the same method of Example 1, with the exception of using the hexafluoroacetylacetone in an amount of 5.0 parts by weight based on 100 parts by weight of the non-aqueous organic solvent.

Comparative Example 1

A lithium battery was produced in substantially the same method of Example 1, with the exception of using no hexafluoroacetylacetone in the electrolyte.

Comparative Example 2

A lithium battery was produced in substantially the same method of Example 1, with the exception of using hexafluoroacetylacetone in an amount of 0.01 parts by weight based on 100 parts by weight of the non-aqueous organic solvent.

Comparative Example 3

A lithium battery was produced in substantially the same method of Example 1, with the exception of using hexafluoroacetylacetone in an amount of 15 parts by weight based on 100 parts by weight of the non-aqueous organic solvent.

Standard capacity: batteries produced in Examples 1-5 and Comparative Examples 1-3 were charged under constant current-constant voltage (CC-CV) condition of 0.5 C/4.2V for 3 hours. The standard capacity of each battery is reported in Table 1.

Battery Lifespan: batteries produced in Examples 1-5 and Comparative Examples 1-3 were charged under CC-CV conditions of 0.5 C/4.2V at 25° C. for 3 hours, followed by discharge at 1 C CC to a cut off voltage of 3 V. The charge/discharge procedure was repeated 300 times. The capacity maintenance ratio (%) at a 300th cycle of each battery was calculated as ratio between discharge capacity at the 300th cycle to a discharge capacity at the first cycle, i.e., according to Formula III below. Results are reported in Table 2.

$$\text{Capacity Main.} = \frac{\text{Disch. Capacity at 300th Cycle}}{\text{Disch. Capacity at 1st Cycle}} \times 100\% \quad \text{Formula III}$$

High-temperature preservation: batteries produced in Examples 1-5 and Comparative Examples 1-3 were charged under CC-CV conditions of 0.5 C/4.2V at 25° C. for 3 hours, followed by storage at 85° C. for 4 days. Variation in thickness of the batteries, as compared to initial thickness, was measured after 4 days.

TABLE 1

| Example No. | Amount of HFAAc* (wt. parts) | Standard capacity (%) | Variation in battery thickness (%) | Capacity maintenance ratio (%) |
|---|---|---|---|---|
| Ex. 1 | 0.05 | 100 | 10 | 70 |
| Ex. 2 | 0.1 | 100 | 6 | 82 |
| Ex. 3 | 1 | 100 | 5 | 80 |
| Ex. 4 | 2 | 98 | 4 | 81 |
| Ex. 5 | 5 | 98 | 5 | 75 |
| Comp. Ex. 1 | 0 | 98 | 24 | 62 |
| Comp. Ex. 2 | 0.01 | 98 | 25 | 65 |
| Comp. Ex. 3 | 15 | 72 | 5 | 45 |

*HFAAc: hexafluoroacetylacetone

As can be seen in Table 1 above, the electrolytes of Examples 1-5 exhibited capacity maintenance ratios after 300 cycles of 70% or more at ambient temperature, and superior high-temperature preservation property, i.e., very low thickness variation.

The electrolyte of Comparative Examples 1, i.e., an electrolyte including no hexafluoroacetylacetone, exhibited only 62% of capacity maintenance ratio and a 24% increase in thickness after preservation at 85° C. for 4 days. The thickness increase of Comparative Example 1, i.e., a 24% increase, was about 2.5-5 times higher than a thickness increase of Examples 1-5.

The electrolyte of Comparative Example 2, i.e., an electrolyte including only 0.01 parts by weight of hexafluoroacetylacetone, exhibited only 65% of capacity maintenance ratio at a 300th cycle and a 25% increase in thickness after preservation at 85° C. for 4 days.

The electrolyte of Comparative Example 3, i.e., an electrolyte including 15 parts by weight of hexafluoroacetylacetone, exhibited a poor standard capacity, i.e., only 72%, and a low capacity maintenance ratio, i.e., only 45%, at a 300th cycle at ambient temperature.

The non-aqueous electrolyte according to embodiments of the present invention may be advantageous in providing an improved capacity maintenance ratio and thickness variation ratio during high-temperature preservation. The non-aqueous electrolyte according to embodiments of the present invention may include hexafluoroacetylacetone in an amount providing improved performance and lifespan of lithium batteries.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A non-aqueous electrolyte for a lithium battery, comprising:
   a non-aqueous organic solvent, wherein the non-aqueous organic solvent includes an ether-based solvent, the ether base solvent having one or more of tetrahydrofuran, 2-methyltetrahydrofuran, and/or dibutyl ether;
   a lithium salt; and
   a hexafluoroacetylacetone in an amount of about 0.02 parts by weight to about 10 parts by weight, based on 100 parts by weight of the non-aqueous organic solvent.

2. The non-aqueous electrolyte as claimed in claim 1, wherein the lithium salt includes one or more of $LiPF_6$, $LiClO_4$, $LiAsF_6$, $LiBF_4$, $LiN(C_2F_5SO_3)_2$, $LiN(C_2F_5SO_2)_2$, $LiN(CF_3SO_2)_2$, $LiSbF_6$, $LiCF_3SO_3$, $LiC_4F_9SO_3$, $LiAlO_4$, $LiAlCl_4$, $LiCl$, $LiI$, and/or $LiN(C_xF_{2x+1}SO_2)(C_yF_{2y+1}SO_2)$, wherein x and y are each independently a positive integer, and a concentration of the lithium salt in the non-aqueous electrolyte is about 0.6 M to about 2.0 M.

3. The non-aqueous electrolyte as claimed in claim 1, wherein the hexafluoroacetylacetone is present in an amount of about 0.1 parts by weight to about 5 parts by weight, based on 100 parts by weight of the non-aqueous organic solvent.

4. A lithium battery, comprising:
a positive electrode facing a negative electrode;
a non-aqueous electrolyte between the positive and negative electrodes; and
a separator electrically separating the positive and negative electrodes,
wherein the non-aqueous electrolyte includes a non-aqueous organic solvent, a lithium salt, and a hexafluoroacetylacetone in an amount of about 0.02 parts by weight to about 10 parts by weight, based on 100 parts by weight of the non-aqueous organic solvent, wherein the non-aqueous organic solvent includes an ether-based solvent, the ether base solvent having one or more of tetrahydrofuran, 2-methyltetrahydrofuran, and/or dibutyl ether.

5. The lithium battery as claimed in claim 4, wherein the positive electrode includes a metal coated with an active material, the active material including one or more of $Li_xMn_{1-y}M_yA_2$, $Li_xMn_2O_{4-z}X_z$, $Li_xMn_{2-y}M_yM'_zA_4$, $Li_xCo_{1-y}M_yA_2$, $Li_xCo_{1-y}M_yO_{2-z}X_z$, $Li_xNi_{1-y}Co_yO_{2-z}X_z$, $Li_xNi_{1-y-z}Co_yM_zA_\alpha$, $Li_xNi_{1-y-z}Co_yM_zO_{2-\alpha}X_\alpha$, $Li_xNi_{1-y-z}Mn_yM_zA_\alpha$ and $Li_xNi_{1-y-z}Mn_yM_zO_{2-\alpha}X_\alpha$,
wherein $0.9 \leq x \leq 1.1$, $0 \leq y \leq 0.5$, $0 \leq z \leq 0.5$, $0 \leq \alpha \leq 2$;
each of M and M' is independently Mg, Al, Co, K, Na, Ca, Si, Ti, Sn, V, Ge, Ga, B, As, Zr, Mn, Cr, Fe, Sr, V or a rare earth element;
A is O, F, S or P; and
X is F, S, or P.

6. The lithium battery as claimed in claim 4, wherein the negative electrode includes metal coated with an active material, the active material including one or more of crystalline carbon, amorphous carbon, a carbon composite, a carbon fiber, a lithium metal, a lithium alloy, and/or a lithium composite.

7. The lithium battery as claimed in claim 4, wherein the hexafluoroacetylacetone is present in an amount of about 0.1 parts by weight to about 5 parts by weight, based on 100 parts by weight of the non-aqueous organic solvent.

* * * * *

UNITED STATES PATENT AND TRADEMARK OFFICE
CERTIFICATE OF CORRECTION

PATENT NO. : 7,816,039 B2  
APPLICATION NO. : 12/000704  
DATED : October 19, 2010  
INVENTOR(S) : Oh et al.

Page 1 of 1

It is certified that error appears in the above-identified patent and that said Letters Patent is hereby corrected as shown below:

Column 10, line 64, Claim 2, "LiAlCl$_4$, LiCl, LiI," should read -- LiAlCl$_4$, LiCl, LiI, --

Column 12, line 3 of Claim 5, after "Li$_x$CO$_{1-y}$M$_y$O$_{2-z}$X$_z$," insert the following: -- Li$_x$Ni$_{1-y}$M$_y$O$_{2-z}$X$_z$ --

Signed and Sealed this
Eighth Day of February, 2011

David J. Kappos
*Director of the United States Patent and Trademark Office*